United States Patent
Vu et al.

(10) Patent No.: US 8,595,131 B2
(45) Date of Patent: Nov. 26, 2013

(54) METHOD FOR PAYING FOR A SERVICE OFFERED BY MEANS OF A DATA NETWORK

(75) Inventors: Tai Duc Vu, Siegertsbrunn (DE); Christian Pho Duc, Hoehenkirschen (DE); Tschangiz Scheybani, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 2085 days.

(21) Appl. No.: 10/484,498

(22) PCT Filed: Jul. 22, 2002

(86) PCT No.: PCT/EP02/08163
§ 371 (c)(1),
(2), (4) Date: Jul. 9, 2004

(87) PCT Pub. No.: WO03/012701
PCT Pub. Date: Feb. 13, 2003

(65) Prior Publication Data
US 2004/0243474 A1 Dec. 2, 2004

(30) Foreign Application Priority Data
Jul. 26, 2001 (DE) .................................. 101 36 414

(51) Int. Cl.
*G06Q 40/00* (2012.01)
(52) U.S. Cl.
USPC ............ 705/39; 705/26.1; 705/26.35; 705/35
(58) Field of Classification Search
USPC .................................................. 705/26, 27
See application file for complete search history.

(56) References Cited

U.S. PATENT DOCUMENTS

| | | | |
|---|---|---|---|
| 5,715,314 A | 2/1998 | Payne et al. | |
| 5,809,143 A | 9/1998 | Hughes | |
| 6,873,974 B1 * | 3/2005 | Schutzer | 705/41 |
| 2001/0007132 A1 | 7/2001 | Regev | |
| 2001/0047336 A1 * | 11/2001 | Maycock et al. | 705/44 |
| 2002/0077837 A1 * | 6/2002 | Krueger et al. | 705/1 |
| 2002/0138445 A1 * | 9/2002 | Laage et al. | 705/67 |
| 2002/0178063 A1 * | 11/2002 | Gravelle et al. | 705/17 |
| 2008/0189216 A1 * | 8/2008 | Nordlicht | 705/80 |

FOREIGN PATENT DOCUMENTS

| | | |
|---|---|---|
| CH | 682700 A5 | 10/1993 |
| WO | 98/52151 A1 | 11/1998 |
| WO | 00/55777 A1 | 9/2000 |
| WO | WO 01/24129 A | 4/2001 |

* cited by examiner

Primary Examiner — Michael Misiaszek
(74) Attorney, Agent, or Firm — Rothwell, Figg, Ernst & Manbeck, P.C.

(57) ABSTRACT

A method is proposed for acquiring a service sold over a data network (20) against presentation of a transaction medium (2). The service is ordered by a user (1) by a user end system (10) from a service provider (40). The latter calls in a clearing center (30) which enters into a data exchange with the transaction medium (2) to call for therefrom a necessary contribution in the form of certain data assumed for acquisition of the service. The ordering process and the data exchange with the transaction medium (2) for calling for the contribution are linked via an identifier (KM) associated with the transaction medium (2), the identifier being determined by the user end system (10) and used to secure the ordering process and the call for the contribution.

19 Claims, 7 Drawing Sheets

METHOD FOR PAYING FOR A SERVICE OFFERED BY MEANS OF A DATA NETWORK

CROSS-REFERENCE TO RELATED APPLICATION

This application is a §371 of PCT Application Serial No. PCT/EP02/08163, filed Jul. 22, 2002.

BACKGROUND OF THE INVENTION

1. Field of the Invention

The present invention is in the field of acquiring a service offered over a data network.

This invention starts out from a method known e.g. from the brochure "Geldkarte im Netz" from the year 2000 published by the applicant. This describes paying for a service to be ordered over the Internet by means of a cash card. A simplified procedure for a payment process is shown on the fourth page of the brochure. Thus, a home computer is used to order a service over the Internet from a service provider, e.g. an information service or online shop. The service provider then turns to a payment center, initiating the execution of a payment process there. The payment center now makes a connection with the cash card over the Internet, the home computer and a card reader connected thereto and debits the required amount to be paid to said card. Successful payment is then acknowledged by the payment center to the service provider, which finally delivers the requested service.

2. Description of the Background Art

The known method is safe with respect to the actual transaction phase involving transfer of the amount to be paid from the cash card to the payment center, i.e. transfer of a contribution necessary for acquiring the service from a transaction medium to a clearing center. However, the method does not secure the ordering process preceding the transaction phase. The certainty that a service delivered by the service provider is actually that ordered by a user and that the subsequently transferred amount of money matches that previously agreed on must be separately effected between user and service provider. If no securing measures are taken, an attack on the ordering/delivery process can consist for example in a service delivered by the service provider benefiting the attacker instead of the original customer.

Techniques for securing the ordering process are fundamentally known. One tried method is for example the encryption of the data exchange. However, known techniques are all independent island solutions making it necessary in particular that the service provider keep a complementary counterpart available for each island solution employable on a user side.

SUMMARY OF THE INVENTION

It is therefore the problem of the invention to specify a method for acquiring a service sold over a data network in which the ordering process is already secured without any special additional requirements for the system components used.

This problem is solved by a method having the features of the main claim. The inventive method has the advantage that it can be realized using only system components that must already be present for carrying out a transaction phase. Since the ordering process is secured using an identifier extracted from the following transaction phase and firmly associated with the transaction medium used, the ordering process is linked homogeneously with the following compensation process. Should this be necessary, the identifier can be used later to prove uniquely the relation between ordering process and transaction phase. The design of the user end system permits the security level to be adjusted as required. Use of a transaction medium integrated into the total system and not executed as an independent unit permits a medium security level to be adjusted. If the functionality of the security terminal is further integrated into the user network interface, this results in an embodiment with a somewhat reduced security level but that is especially cost-effective and can be realized for example by a conventional PC. Regardless of the security level realized in the user end system, the clearing center can always have the same structure. The total method can be performed anonymously. The inventive method is especially suitable for loading a dedicated account kept with a service provider, for example for loading a prepaid account with a telephone company. Use of an identifier uniquely designating the transaction medium in the ordering and compensation process makes it possible to do without immediately reversing the transaction in case of an error and instead provide a subsequent correction of method execution using the identifier of the transaction medium. Coupling an acquisition process with an identifier firmly associated with a transaction medium gives the service provider the possibility of recognizing a transaction medium in case of repeated acquisition of a service.

Advantageously, the clearing center, after receiving the identifier of the transaction medium, in turn generates an identifier permitting a total acquisition process to be later associated uniquely with a transaction medium and a clearing center.

For further improving security in the ordering process, the time between individual method steps is advantageously monitored; if a predetermined maximum time is exceeded the ordering process is aborted. Such time-out monitoring in particular additionally impedes attackers from cutting into the ordering process.

In an expedient development of the inventive method, the identifier of the transaction medium and the identifier of the clearing center are logged both in the user system and in the clearing center itself.

In an especially advantageous realization of the inventive method, a user requests a desired service from a service provider first according to kind, e.g. the loading of a certain prepaid account with a telephone company. He then specifies the recipient and extent of the desired service only to the clearing center. This structure permits the user to always enter into contact with the service provider without the latter having to take any further measures for securing the ordering process itself.

Expediently, a desired service is associated with a customer by input of reference information on the user end system and transfer to the clearing center.

BRIEF DESCRIPTION OF THE DRAWINGS

An embodiment of the invention will be explained in more detail hereinafter with reference to the drawing, in which.

DETAILED DESCRIPTION OF THE INVENTION

Figure 1:
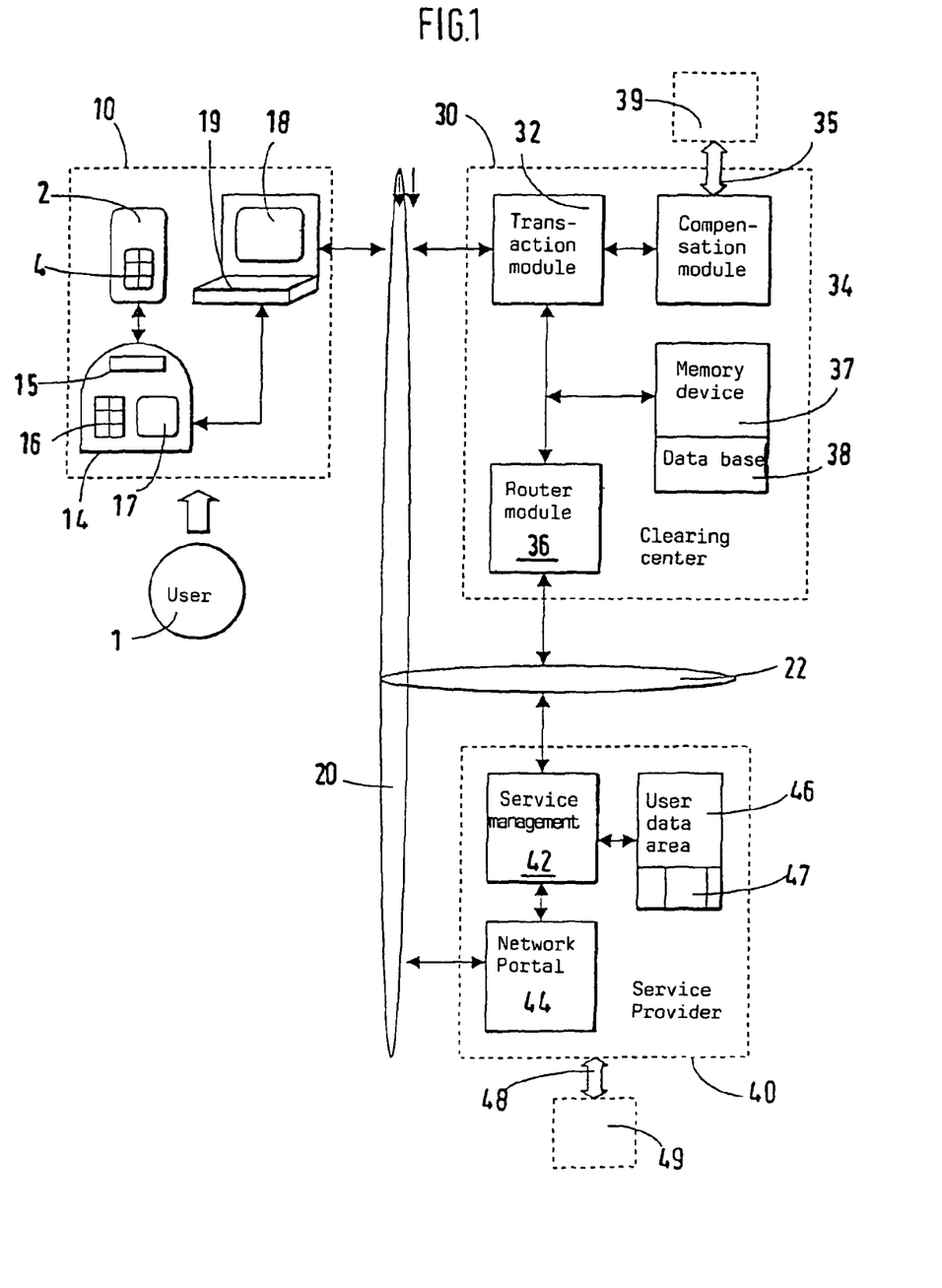
FIG. 1 shows the structure of a system suitable for executing the proposed method.

FIG. 1 illustrates the structure of a system for acquiring a service over a data network. The system includes user end system 10 connected over first data network 20 with clearing center 30 and service provider 40. Clearing center 30 and service provider 40 are in addition interconnected over second data network 22. Second data network 22 can be formed as a separate data network or else within first data network 20. For clarity's sake, network subscribers 10, 30 and 40 are each rendered singly, while in practice they can each be present many times. Typically, data network 20 has connected thereto a plurality of user end systems 10 and a plurality of service providers 40. Data network 20 normally has connected thereto in addition a plurality of clearing centers 30. A plurality of clearing centers 30 can each be connected with a plurality of service providers 40 over one or more second data networks 22.

User end system 10 permits user 1 to determine, order and compensate a service to be ordered over data network 20 by providing certain data whose possession is assumed for acquiring a service. Internally, it is structured into transaction medium 2, security terminal 14 formed for communication with transaction medium 2, and user network interface 19 connected firstly with security terminal 14 and secondly with data network 20. The physical separation of structural components 2, 14, 19 depends on the security level selected. For maximum security, components 2, 14, 19 are each formed as independent units, while in a medium security level user network interface 19 and security terminal 14 are executed as independent units and transaction medium 2 is only present in a virtual form, i.e. as a software solution. In case of low security requirements, all components 2, 14, 19 can also be realized in a single common unit.

Transaction medium 2 enables user 1 to acquire a service sold over data network 20 from service provider 40, which assumes a contribution is made by transaction medium 2. It permits transactions to be performed for which the possession of certain data is assumed and in which sensitive data and information are exchanged between security terminal 14 and another network subscriber 30, 40. For example, it permits amounts to be paid to be transferred to a payee's cash account by direct removal of money existing in electronic form from transaction medium 2 or by irrevocably, indirectly causing an amount to be paid to be transferred from a cash account associated with transaction medium 2. The security effect of transaction medium 2 is based on its secure accommodation of sensitive data on a specially designed medium, which is preferably a separate unit.

Transaction medium 2 has tamperproof memory device 4 storing data whose possession is assumed for acquiring a service. Such data can be e.g. money in electronic form or data permitting direct access to a cash account kept in an external device. Memory device 4 can additionally store data whose importance consists solely in the information represented thereby, for example cryptographic keys or access codes. The same transaction medium 2 can also have methods of payment and acquisition information set up therein side by side. Transaction medium 2 further has associated therewith individual identifier KM which is deposited on transaction medium 2, expediently in memory device 4. Additionally, identifier KM can also be stored in another memory device of user end system 10 or with a network subscriber connected over data network 20. Identifier KM used is information that is employed after implementation of a prenegotiation phase by means of transaction medium 2 in the course of the implementation of a compensation phase.

To guarantee maximum security, transaction medium 2 is preferably executed as an independent unit. In an expedient execution, transaction medium 2 has the form of a portable data carrier in credit card format; in particular, transaction medium 2 can be a chip card. In the latter execution, memory device 4 is realized in the chip of the card and the data to be presented for acquiring a service, representing e.g. electronic money or an access code, and identifier KM are located in the card chip.

If the security requirements are not as high, execution as a separate unit can be dispensed with and transaction medium 2 executed only in virtual form, e.g. as a software solution in security terminal 14, in user network interface 19 and/or in a network subscriber connected via data network 20. It is then called up for example with the aid of an access code, e.g. a PIN or TAN (transaction number) to be inputted by user 1. Transaction medium 2 can also be formed by interaction of a plurality of separate, distributed components interconnected by identifier KM. For example, it can consist of a portable data carrier with identifier KM deposited thereon and affiliated memory device 4, which is realized as a software solution in user end system 10 or in a network subscriber connected over data network 20.

Security terminal 14 corresponds firstly to transaction medium 2 and permits access to data stored in memory device 4. Secondly, it forms the user-system end of a safe end-to-end connection. In this function, security terminal 2 checks and secures the total data exchange in the course of the method for acquiring a service over data network 20 and comprises the means necessary therefor. In particular, it secures the prenegotiation phase, provides acknowledge or error messages and logs the particular data exchange conducted.

The core element of security terminal 14 is a processor apparatus designed to make a safe end-to-end connection between transaction medium 2 and clearing center 30, i.e. a connection whose security is effected only by the terminals involved in a transaction, and to use said safe connection to execute movements of data between transaction medium 2 and clearing center 30 while including user 1. Security terminal 14 has for this purpose access device 15 permitting it to access data stored on transaction medium 2 and identifier KM. Preferably, access device 15 permits write and read accesses with respect to data located on transaction medium 2, i.e. both the removal of contents represented by the data from transaction medium 2 and, conversely, the application of contents represented by the data to transaction medium 2. Security terminal 14 further has input means 16, preferably in the form of a keyboard, for transfer of information by user 1 to security terminal 14, and output means 17, expediently in the form of a display, for communication of information by security terminal 14 to user 1.

Security terminal 14 is of tamperproof design so as to rule out unauthorized removal of data, e.g. data representing money values, from transaction medium 2 or the generation of such data by user 1. For this purpose, access device 15, input means 16 and output means 17 are each separately of tamperproof design and connected with the processor apparatus to form a unit such that a hardware or software attack on one of components 15, 16, 17 is only possible by destroying it or at least can only be done in such a way as to be immediately visible. To guarantee the security of data transferred in a transaction, the processor device comprises means for encrypting outgoing data and decrypting incoming data as well as means for authenticating certificates received from parties to the transaction.

If transaction medium 2 is executed as a chip card, security terminal 14 is expediently a so-called class 3 chip card reader, i.e. a device with access device 15 in the form of a chip card reader, a separate tamperproof keyboard, a tamperproof alphanumeric display for displaying security-relevant data before transfer to a chip card, and encryption software.

If the required security of user end system 10 makes it unnecessary to link input and output means with the processor apparatus in tamperproof fashion, security terminal 14 can also be realized as an integral part of user network interface 19. In this case it does not have any separate input and output means but uses those provided by user network interface 19. The functionality of security terminal 14 can be realized here as a hardware slide-in module with an independent processor apparatus, or in the form of a pure software solution using the processor apparatus of user network interface 19.

User network interface 19 is a device allowing user 1 to enter into contact inter-actively with clearing center 30 or service provider 40 over data network 20. The basis of user network interface 19 is a computer having all the usual structural features. In particular, user network interface 19 has input/output device 18 having display means, e.g. in the form of an image display, for displaying information transferred to user network interface 19, and input means, e.g. in the form of a keypad, permitting user 1 to transfer information to network subscriber 30, 40 connected to data network 20. In addition, user network interface 19 comprises a bidirectional interface to data network 20. The processor apparatus of user network interface 19 is prepared for obtaining information and program elements over data network 20 and applying or executing them. A typical embodiment of user network interface 19 is a home computer. However, user network interface 19 can also be realized by a publicly accessible network terminal as used e.g. in Internet cafes, or by an accordingly equipped cell phone.

Data network 20 is preferably the Internet. In this case, network subscribers 10, 30, 40 are accordingly organized as Internet subscribers and have a structure adapted to the technical specifications applying to said network in the way known in the art. However, data network 20 can also be realized by any other network structure suitable for making a data or communication link between a plurality of network subscribers 10, 30, 40. Data network 20 can consist of an interconnection of a plurality of networks of physically different form. For example, user end system 10 can be connected over a mobile radio network linked with a fixed network via the mobile radio network operator.

Clearing center 30 normally has the form of a large-scale computer with high computing power on which functions for executing transactions involving the exchange of sensitive data are realized in the form of software modules. Clearing center 30 is typically located with a service provider specializing in handling transactions to be executed over a data network and is accessible only to a limited, specially authorized group of persons. In an embodiment of practical importance, clearing center 30 is a payment center and serves to execute payment processes over data network 20, in particular the Internet.

Essential elements of clearing center 30 are transaction module 32, compensation module 34 connected therewith and router module 36 connected with said two modules; an important hardware element of clearing center 30 is memory device 37.

Transaction module 32 comprises means for controlling data exchange with user end systems 10 over data network 20 and with clearing centers 40 over second data network 22, means for carrying out and securing an ordering process, and means for causing delivery of a service.

Compensation module 34 serves to coordinate and handle secure data exchange for calling for a contribution required from transaction medium 2, e.g. for executing a payment process, in interaction with transaction medium 2 over affiliated security terminal 14 and has all the program and hardware means necessary therefor. It further coordinates the handling of different parallel acquisition processes. Compensation module 34 moreover has interface 35 to background system 39 on which background processes necessary in connection with carrying out a service acquisition method are executed whose execution by clearing center 30 is not possible or not expedient. Background processes of this kind are for example the keeping of cash accounts and the handling of transactions between different cash accounts. Typical background system 39 is accordingly a bank or association of banks or a clearing system which keeps cash accounts associated with transaction medium 2 and with clearing center 30.

Router module 36 manages the data exchange between transaction module 32 and clearing center 40 over second data network 22.

Memory device 37 comprises data base 38 for receiving identifiers KM of payment media 2 and session keys RS, SS used in the course of acquisition processes in connection with identifiers KM. Memory device 37 further has deposited therein public key ÖS of clearing center 30 and corresponding secret key GS for execution of secure communication over data network 20.

Service provider 40 is a network subscriber with respect to data network 20, like user end system 10 or clearing center 30. Usually it has the form of a high-power computer on which services are made available under an operator's control in software form which user 1 can access over data network 20. Technically, service provider 40 can be realized by a networked group of computers that only behaves logically like one network subscriber.

The services offered by service provider 40 can fundamentally be any kind of goods or services marketable over data network 20, e.g. digital goods delivered against payment such as software programs, physically existing consumer items delivered against payment, or digital goods delivered on proof of authorization as a recipient such as a PIN (personal identification number). The proposed method is especially suitable for services provided by service provider 40 without user 1 being able to directly check provision. Thus, the method is suitable for example for utilization of the mobile radio network of a mobile radio provider on the basis of prepaid credits. In addition to actual provision of the service, the proposed method supports a longer-term commitment between service provider 40 and user 1 since it induces user 1 to turn to service provider 40.

Essential structural elements of service provider 40 in regard to the method described here are service management device 42, user data area 46 and network portal 44.

For each reference information RI transferred to user 1 on the basis of which a service can be ordered from service provider 40, service management device 42 keeps reference file 47 in user data area 46. Reference files 47 are preferably dedicated and allow only transactions with respect to one, or a group of, defined services. In practice they are used for example for keeping credits on services yet to be provided by service provider 40. In connection with services against payment that are yet to be provided, reference files 47 have the function of a credit account. In this case it is expediently provided that a service is only provided if credit account 47 used for its payment has sufficient funds.

Network portal 44 is used for making the first contact between service provider 40 and user end system 10. It informs user 1 about service provider 40 and the services offered by service provider 40 and gives instructions for effecting payment of a desired service. It comprises for this purpose data packets in software form that, when called up, are transferred over data network 20 to user end system 10 and displayed to user 1 there. If data network 20 is the Internet, network portal 44 has the usual form of an Internet presence and is accessible to user 1 like such a presence.

Network portal 44 further makes data packets with information and program elements available for carrying out an acquisition process. Said data packets referred to hereinafter as load applets LA can be stored with service provider 40 itself or with a network subscriber connected therewith, in particular in clearing center 30. In the latter case, network portal 44 holds and transfers references to the particular place of storage. Load applets LA designate clearing center 30 through which a selected service can be acquired. Further, load applets LA each contain program elements that enable user end system 10 to execute an order and an associated payment process through clearing center 30. Load applets LA are transferable to user end system 10 over data network 20.

Service provider 40 further has via interface 48 a connection to background system 49 on which background processes necessary in connection with carrying out a service acquisition method are executed whose execution by service provider 40 itself is not possible or not expedient. Such background processes include in particular the keeping of cash accounts and the effecting of money transfers between different cash accounts. Background system 49 is accordingly formed for example by a bank, an association of banks or a clearing system which keeps a cash account associated with service provider 40. Background system 49 is connected with background system 39 and can also be identical therewith.

Clearing center 30 and service provider 40 can further coincide and be realized in the form of one network subscriber. Likewise, background system 39, 49 can be an integrated part of clearing center 30 or service provider 40. An example of a network subscriber having the functionalities of clearing center 30, service provider 40 and background system 39, 49 is a bank.

With reference to FIGS. 2 to 7, the use of the above-described system for acquiring a service over data network 20 will be described hereinafter.

The method of use is fundamentally divided into a prenegotiation phase and a transaction phase, the latter being in turn divided into a compensation phase and a delivery phase. The prenegotiation phase and compensation phase are carried out between user end system 10, in particular security terminal 14 and transaction medium 2, and clearing center 30; the delivery phase is carried out including service provider 40. In the prenegotiation phase a service is ordered using identifier KM, in the compensation phase a contribution to be made by payment medium 2 as a condition for delivery of the service is called for using identifier KM, and in the delivery phase the service is made available for delivery to user 1.

To permit the method to be described more clearly, it will be fundamentally assumed hereinafter that service provider 40 is a mobile radio network operator and user 1 wishes to load a network time credit account kept with mobile radio network operator 40 by means of a cash card via user end system 10 to continue to be able to use a cell phone. Reference file 47 acts in this scenario as a network time credit account, service management device 42 appears as an account management unit, transaction medium 2 as a cash card; the service provided by service provider 40 is to make its network available for a limited time. The contribution that transaction medium 2 has to make to acquire the service is made by the transfer of electronic money from cash card 2 to a cash account associated with the mobile radio network operator.

The method is not limited to the aforementioned exemplary application. It can be used whenever the acquisition of a service sold over data network 20 is effected by successively executing first an ordering process and then a transaction phase using identifier KM associated with transaction medium 2. A further application of this kind is for example the acquisition of information that is basically free of charge but security-critical, e.g. a PIN, that subsequently permits access to otherwise blocked service offers of service provider 30.

Figure 2:
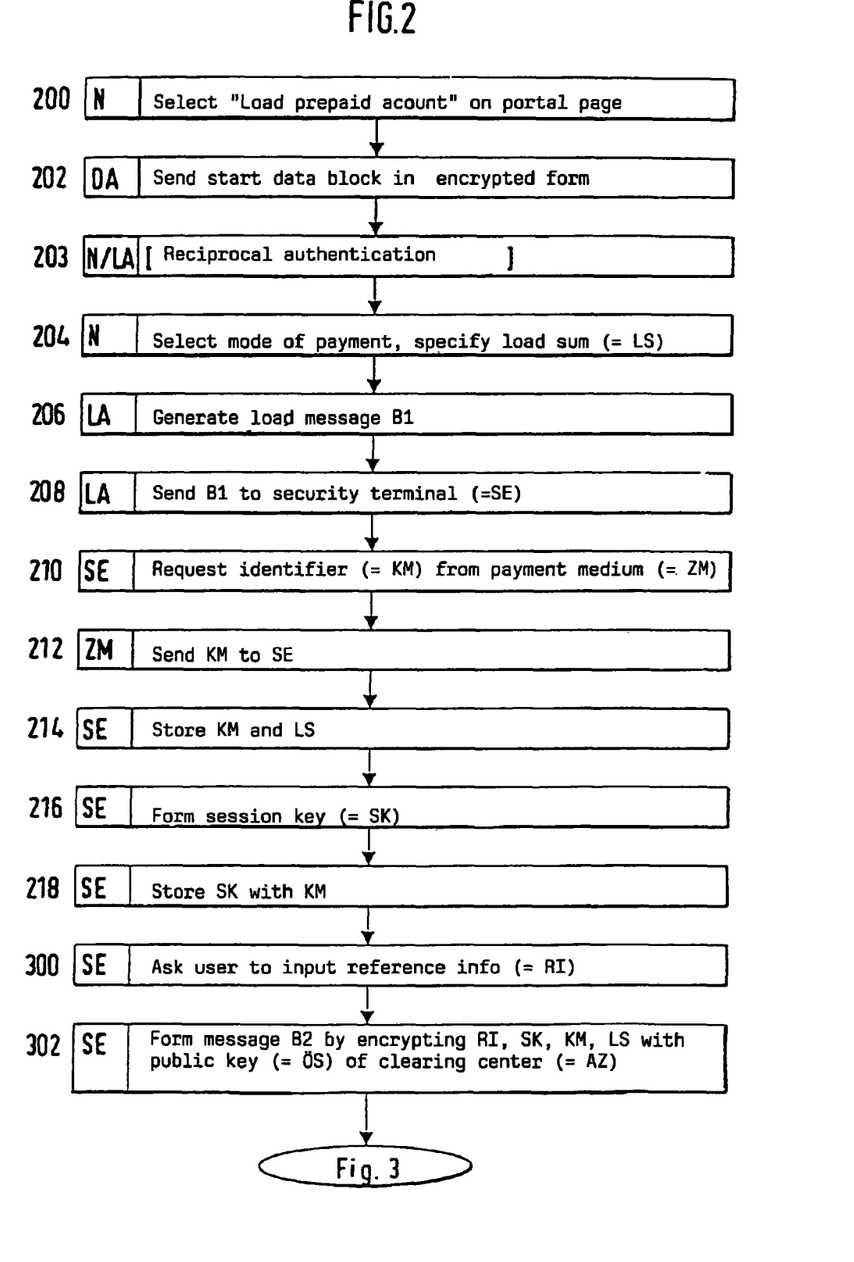
FIGS. 2 to 7 show flowcharts of the execution of the proposed method on such a system.

Use commences by user 1 making a connection to network portal 44 of service provider 40 over data network 20 by means of user end system 10, inspecting the information offer thereupon provided by network portal 44 and selecting the option "Load prepaid account" from the information offer, step 200. Following this selection, network portal 44 of service provider 40 transfers to user end system 10 a start data block containing data about clearing center 30 to be selected, supported modes of payment, contact address AD for processing complaints that might be necessary, and load applet LA, or a reference to its place of storage, which causes security terminal 14 to be included in an acquisition process and required information to be inputted by user 1, step 202. Step 202 is preferably effected in a security mode that can be used directly by both sides involved in data exchange, for example with encryption according to the SSL protocol.

When load applet LA has been received and installed in user network interface 19 it makes a connection over data network 20 with clearing center 30 designated in the start data block.

If the service provided by service provider 40 is to deliver personal information, load applet LA expediently, after the connection is made, first causes reciprocal authentication between user 1 and clearing center 30, step 203. User 1 and clearing center 30 thereby prove their authenticity reciprocally by checking the other's knowledge of a predefined secret. On the user side the secret can be for example a PIN to be inputted, or it can be deposited on a signature card expediently readable by means of security terminal 14 and from which it is read.

When the connection with clearing center 30 has been made and authenticity proven, if such a step is intended, load applet LA opens the prenegotiation phase. For this purpose it generates a display on input/output device 18, step 204 asking user 1 to specify a mode of payment and desired load sum LS. User 1 provides the required data using the input means of input/output device 18. When the input is finished, load applet LA generates load message B1 containing the chosen mode of payment, specified load sum LS and complaint contact address AD, step 206.

If payment medium 2 is not realized as a physically independent unit, load applet LA additionally generates individual identifier KM for payment medium 2.

Load message B1 is transferred by load applet LA to security terminal 14, step 208.

After reception of load message B1 in security terminal 14 the latter checks whether transaction medium 2 is accessible to access device 15. If that is not the case, security terminal 14 transfers to user network interface 19 an acknowledgement causing it to display on the display means of input/output device 18 a request to user 1 to present transaction medium 2 to access device 15. If transaction medium 2 is realized only virtually, user 1 gets a request to make it accessible by corresponding inputs via input/output device 18.

When transaction medium 2 is presented and access thereto possible, security terminal 14 requests from transaction medium 2 its individual identifier KM via access device 15, step 210. Transaction medium 2 hereupon transfers its individual identifier KM to security terminal 14, step 212.

If the method is carried out without physically existing transaction medium 2, security terminal 14 obtains identifier KM through load applet LA in the message sent in step 208. Load applet LA can directly comprise identifier KM here. It can also act only as a mediator and obtain identifier KM in a separate data exchange over data network 20, for example from clearing center 30. It can moreover be provided that identifier KM is displayed to user 1 on output means 17 of security terminal 14 and must be acknowledged by user 1.

Identifier KM and load sum LS specified by user 1 are stored by security terminal 14 for further use in the following course of the method, step 214. In addition, security terminal 14 generates session key SK, step 216. Session key SK is generated by a conventional method, typically a method based on generation of random numbers. Transaction medium 2 can also be included therein and deliver a random number for example. Session key SK is stored by security terminal 14 for the further method similarly to the storage of identifier KM, step 218.

Figure 3:
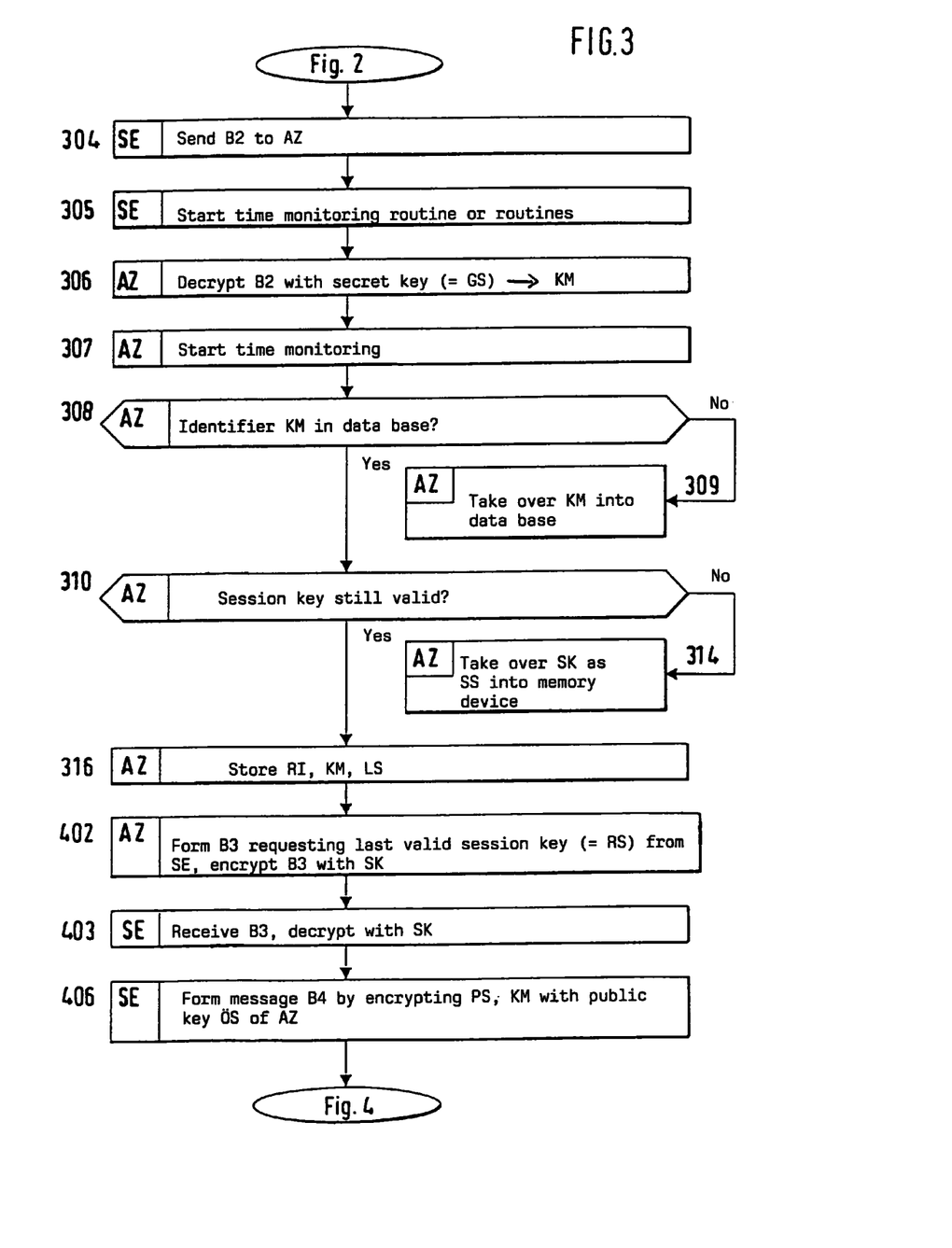

Then security terminal 14 asks user 1 by a corresponding display on output means 17 to input reference information RI designating the commitment of user 1 to service provider 40, step 300. In the assumed scenario of loading a prepaid network time credit account with a mobile radio network operator, reference information RI consists for example in the phone number of the associated cell phone. To attain maximum security it is expediently provided that user 1 acknowledges reference information RI by repeating the input.

When reference information RI inputted by user 1 is then available, security terminal 14 generates first prenegotiation message B2. For this purpose it forms an information block comprising reference information RI, session key SK, identifier KM and load sum LS and encrypts it with public key ÖS of clearing center 30, step 302. Public key ÖS of clearing center 30 can have been transferred within the start data block obtained from network portal 44 at the first contact. Alternatively, a separate method step can be provided by which security terminal 14 requests public key ÖS of clearing center 30 from the latter.

Prenegotiation message B2 then present and secured by encryption is transferred over data network 20 to clearing center 30 designated by load applet LA, step 304. Upon transmission of message B2 security terminal 14 at the same time starts time monitoring, step 305. One or more time periods are thereby defined within which one or more predetermined messages must have been received by clearing center 30. If a time period expires without the expected message being received, the method is aborted. Monitoring relates for example to the time periods until reception of second prenegotiation message B5 and/or until the onset of the payment process.

After receiving it, clearing center 30 decrypts secure prenegotiation message B2 with secret key GS corresponding to public key ÖS used for encryption and determines identifier KM of transaction medium 2 and session key SK, step 306. At the same time, clearing center 30 in turn likewise starts time monitoring, step 307. It monitors for example the time period until reception of enabling signal B6.

Figure 4:
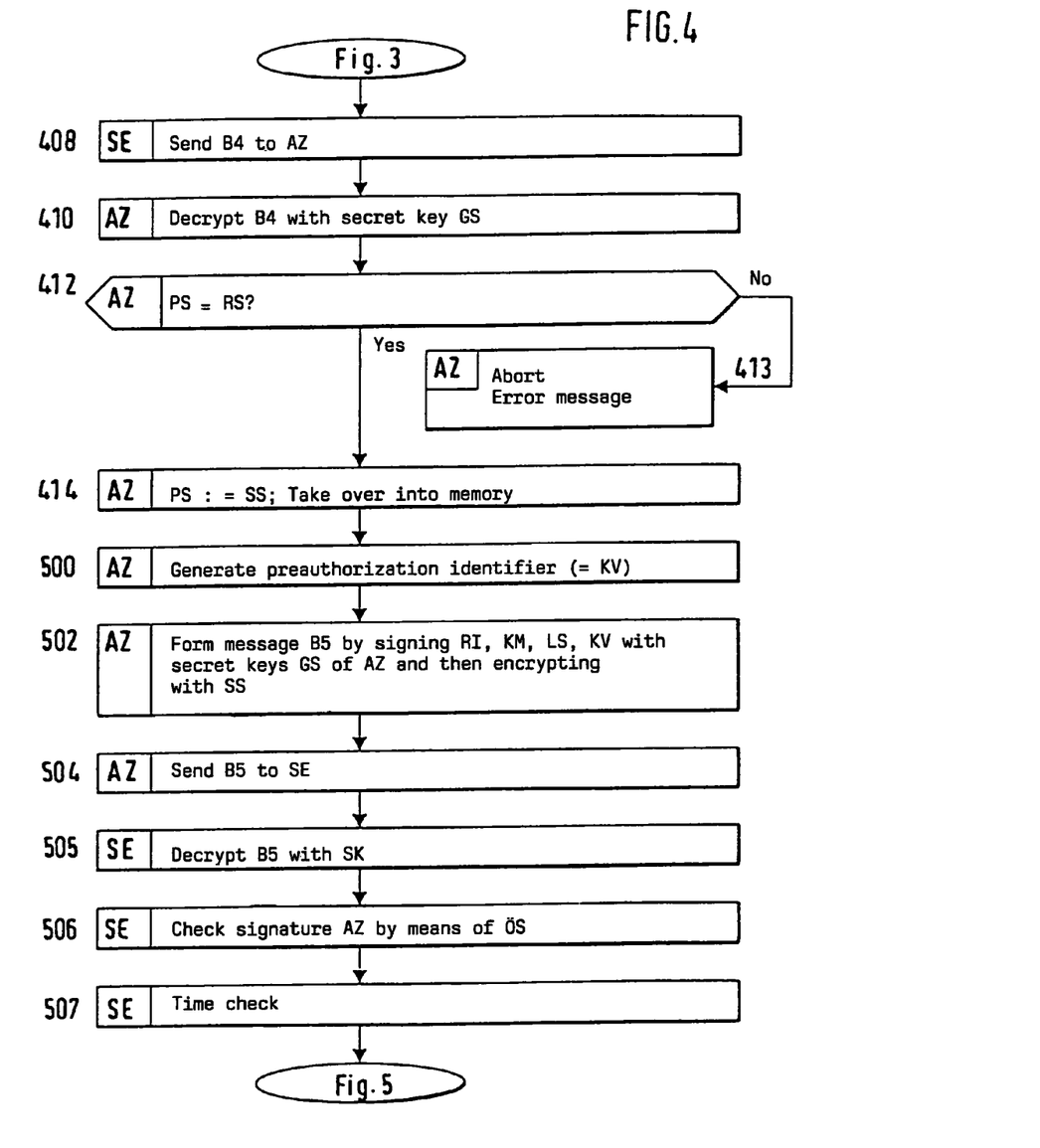

Now clearing center 30 checks, step 308, whether identifier KM is already stored in its data base 38, step 308. If that is the case, clearing center 30 checks whether session key RS last stored in connection with the same identifier KM is still valid, step 310. Each session key SS has a predetermined validity period associated therewith. If this period has not yet expired, clearing center 30 requests by inquiry B3 over data network 20 from security terminal 14 last valid session key PS stored there, step 402. Inquiry B3 is secured by encryption with transferred session key SK.

In addition, clearing center 30 takes over transferred reference information RI, transferred load sum LS and identifier KM to memory device 37, step 316.

If the check in step 308 yields that transferred identifier KM is not yet contained therein, clearing center 30 takes it over as a new entry into data base 38, step 309.

If the check in step 310 yields that session key RS last stored in connection with the same identifier KM is no longer valid since the validity period has expired, clearing center 30 makes transferred session key SK the new valid session key SS and takes it over into its memory device 37, step 314.

Security terminal 14 receives inquiry B3 and decrypts it with session key SK, step 403. Then it in turn forms secure response B4 containing identifier KM of transaction medium 2 and session key PS used in the last preceding payment process, step 406. Securing is done by encryption with public key ÖS of clearing center 30. Response B4 thus secured is transferred by security terminal 14 to clearing center 30, step 408.

The latter decrypts secure response B4 after reception with its secret key GS corresponding to public key ÖS used during encryption, step 410. Preceding session key PS resulting from decryption is in turn compared by clearing center 30 with stored session key RS, step 412.

If the two do not match, clearing center 30 transfers an error message to security terminal 14 and aborts communication with security terminal 14, step 413. It can also be provided that said abortion is effected without an error message.

If the check in step 412 yields a match of compared session keys PS and RS, clearing center 30 defines already stored, preceding session key PS as new valid session key SS, step 414.

Figure 5:
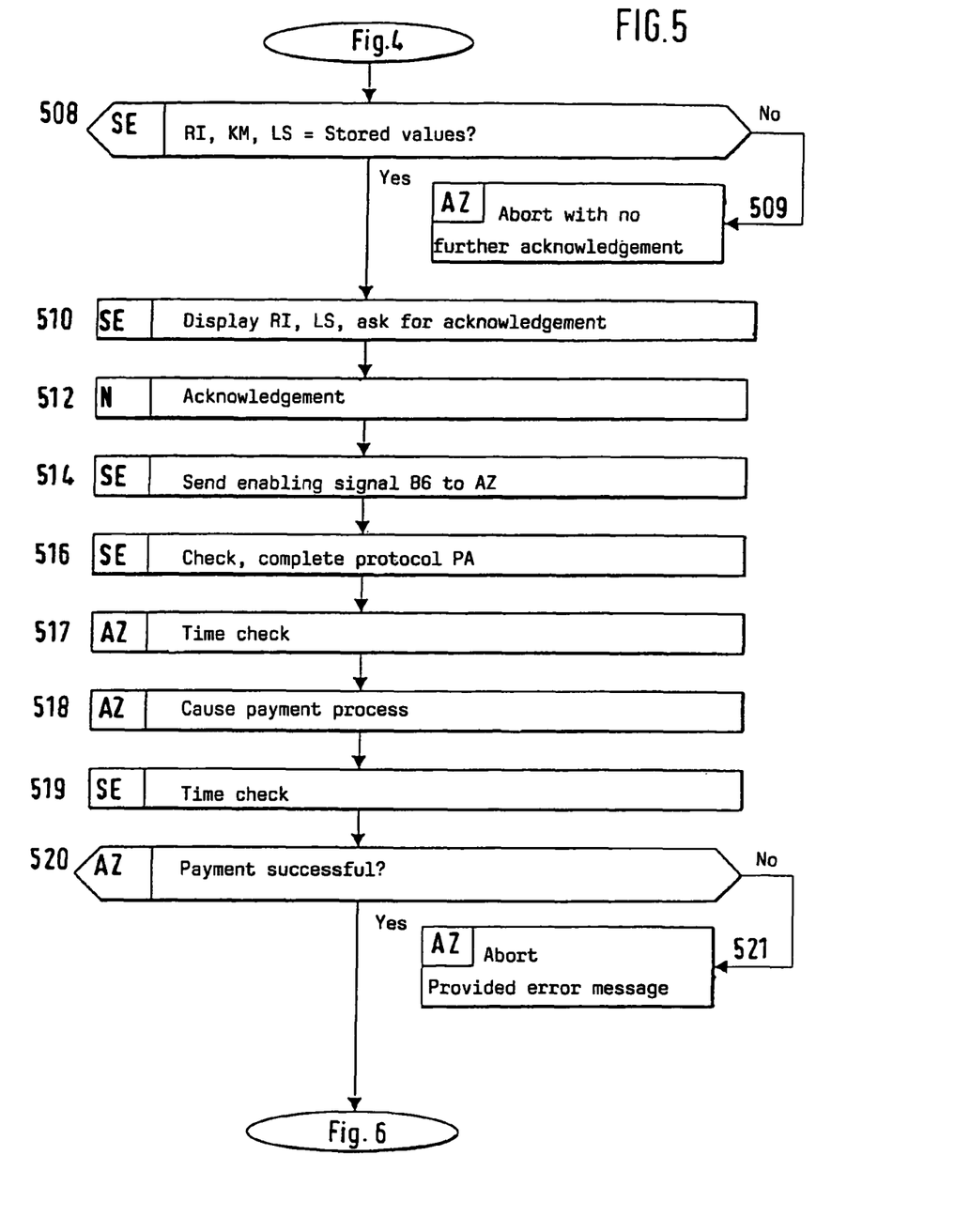

In the next step, clearing center 30 generates preauthorization identifier KV, step 500. Preauthorization identifier KV is used for unique identification of a transaction. It is stored by clearing center 30 and later supports the proof of successful execution of the prenegotiation and compensation phases after the end of said phases, above all in the case of an error. Preauthorization identifier KV is expediently obtained by execution of a later reconstructible algorithm; in especially simple fashion the preauthorization identifier is a continuous number.

Using preauthorization identifier KV it then forms second prenegotiation message B5. For this purpose, clearing center 30 joins preauthorization identifier KV with the stored information for identifier KM, load sum LS and reference information RI, signs this information group with secret key GS of clearing center 30 and also encrypts it with session key SS, step 502. Resulting second prenegotiation message B5 is transferred by clearing center 30 over data network 20 to security terminal 14, step 504.

The latter decrypts second prenegotiation message B5 using session key SS, step 505, and checks the signature using public key ÖS of clearing center 30, step 506. In addition it checks by its time monitoring whether prenegotiation message B5 was received within the permissible time period, step 507. The representations for reference information RI and load sum LS that are present after decryption are then compared by security terminal 14 with the previously stored corresponding information, step 508. If this comparison yields that one or more pieces of the compared information do not match, security terminal 14 aborts communication with clearing center 30 without any further acknowledgement, step 509.

If the comparison in step 508 yields a match of all compared information, security terminal 14 displays reference information RI and load sum LS on output means 17 and asks user 1 for acknowledgement via input means 16, step 510. Via input means 16 of security terminal 14 user 1 then acknowledges the data, step 512.

When acknowledgement has been made by user 1, security terminal 14 generates enabling signal B6 and sends it to clearing center 30, step 514.

Clearing center 30 further generates protocol PA with all data and information sent to security terminal 14. It transfers protocol PA to security terminal 14, which checks it and optionally adds further information present in security terminal 14, step 516. Protocol PA then comprises in particular preauthorization identifier KV and the signature of clearing center 30. Thus completed, it is sent by security terminal 14 to user network interface 19 where it is stored. Protocol PA permits user 1 to make a complaint in case of a subsequent premature termination of the method. This ends the prenegotiation phase, and the compensation phase follows with the call for the contribution to be made by transaction medium 2 for acquiring the service as the first part of the transaction phase.

On reception of enabling signal B6 clearing center 30 first checks in its time monitoring whether it was received within the permissible time period, step 517. If that is the case, clearing center 30 initiates a payment process known in the art over data network 20, step 518. Security terminal 14 thereby first checks in its time monitoring whether the payment process was commenced within the permissible time period, step 519. If that is the case, the payment process is then carried out.

The payment process is effected between user end system 10 and compensation module 34 in clearing center 30. Like the prenegotiation phase, it is based on the use of identifier KM of transaction medium 2. Including identifier KM in the payment process and the prenegotiation phase makes a direct link in content between the two parts of the method. Identifier KM can be used later to make an association if necessary.

The payment process can be of the type as described in the publication "Geldkarte im Netz" referred to at the outset. First it is ensured that a safe end-to-end connection exists between clearing center 30 and security terminal 14 by transaction medium 2 and clearing center 30 exchanging authentication. A key for encryption is determined using identifier KM of transaction medium 2, with the aid of which a key or pair of keys is derived. Identifier KM thus constitutes a unique connecting link between the ordering process and the payment process. Using the key or pair of keys a data exchange is then effected in which the electronic money located in memory 4 of transaction medium 2 is reduced by the amount to be paid, i.e. load sum LS, and a corresponding amount credited to clearing center 30, the amount to be paid thus being transferred from transaction medium 2 to clearing center 30.

The payment process need not necessarily be effected on the user side using the same structural means that were used for the prenegotiation phase. It is also possible for example to use a special payment medium that is connected with transaction medium 2 via identifier KM but not identical with transaction medium 2 and/or to dispense with the use of security terminal 14. However, in the former case identifier KM must either be stored in user end system 10 or with a network subscriber connected over data network 20, or be inputted manually by user 1.

If the payment process is not successful, the whole acquisition method is ended, step 521. User 1 receives an error message provided as part of the payment process.

If the payment process is successful, compensation module 34 acknowledges this to transaction module 32 by transferring an acknowledge signal containing identifier KM. This ends the compensation phase.

Figure 6:
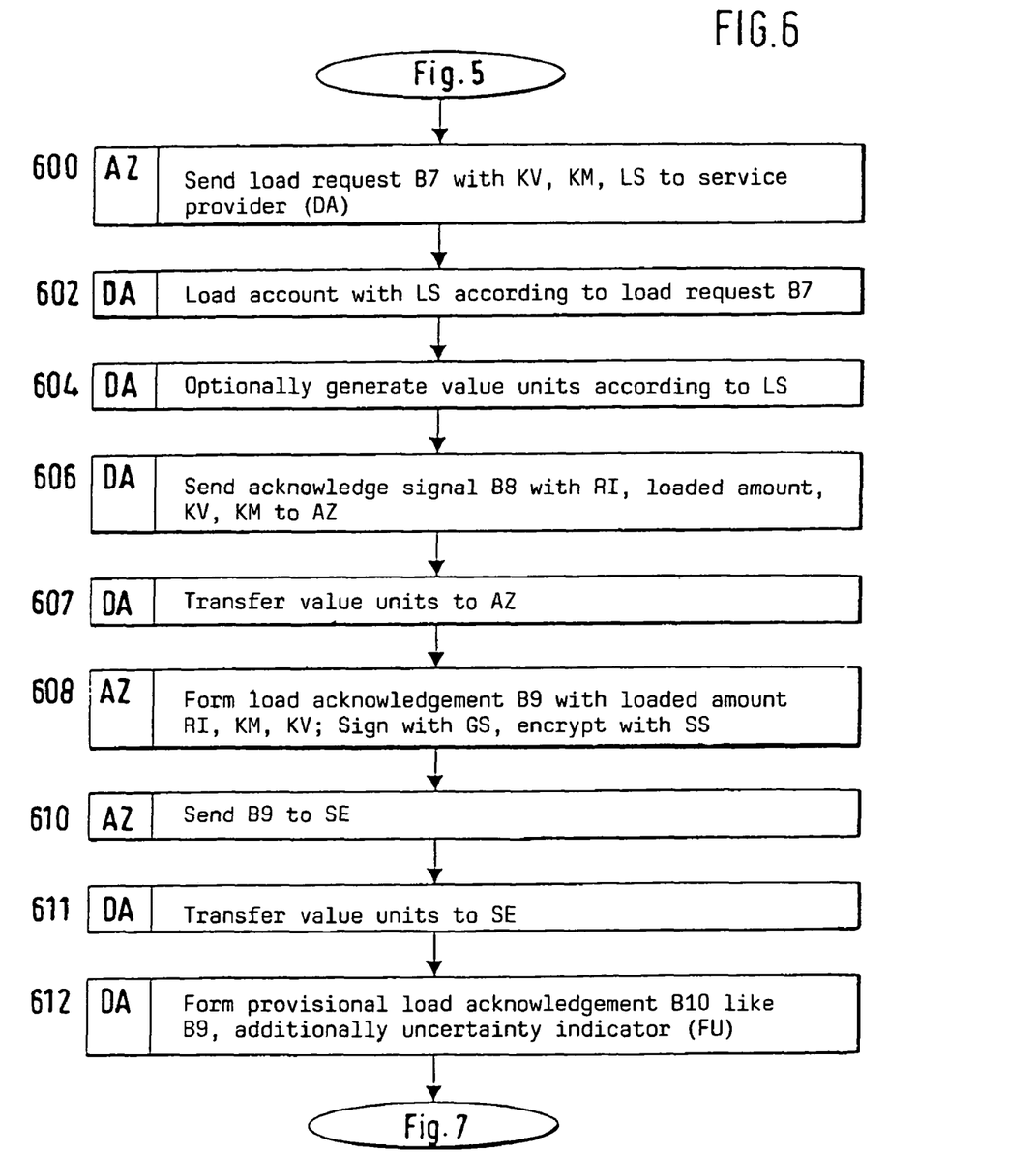

Clearing center 30 now initiates the delivery phase in the course of the transaction phase. By means of router module 36 it makes a connection with service provider 40 over background data network 22 and transfers load request B7 thereto, step 600. Said request contains preauthorization identifier KV, reference information RI, identifier KM and load sum LS.

After reception by service provider 40, service management device 42 forms a network time credit corresponding to load sum LS, step 602. If the service ordered by user 1, in this example telephoning in the network operator's mobile radio network, is utilized by reducing an existing network time credit, service provider 40 loads the network time credit into reference file 47 designated in load request B7.

In connection with providing the service it can be provided that user 1 associated with reference information RI is transmitted value units corresponding to the network time credit, i.e. load sum LS. If that is the case, service provider 40 effects the generation of value units after reception of load sum LS, step 604. The value units are transferred to user 1. The network time credit is managed accordingly in reference file 47.

If value units are used it can, on the other hand, be provided that reference file 47 is not loaded and user 1 is transferred the network time credit fully in the form of value units. Upon utilization of the service the value units are then returned to service provider 40 by user 1 and thus used up. Reference file 47 in this case expediently effects a checking management.

If the loading of reference file 47 and/or generation of value units is successful, service provider 40 transfers acknowledgement signal B8 to clearing center 30, step 606. If some were generated, service provider 40 in addition transfers the value units to clearing center 30 together with acknowledgement signal B8 or immediately thereafter, step 607.

Upon reception of acknowledgement signal B8 clearing center 30 in turn forms load acknowledgement B9 containing reference information RI, load sum LS, preauthorization identifier KV and identifier KM. It signs the load acknowledgement with secret key GS of clearing center 30 and encrypts it with session key SS, step 608. It transfers thus formed load acknowledgement B9 over data network 20 to user end system 10, step 610. Together or immediately thereafter it also transfers the optionally formed value units to user end system 10, step 611.

If an error occurs during loading of user account 47 in step 602 or clearing center 30 does not receive acknowledgement signal B8 from service provider 40 after transmitting load request B7, clearing center 30 generates provisional load acknowledgement B10, step 612. The latter firstly contains the same data as contained in load acknowledgement B9 after a successful loading process. Additionally, provisional load acknowledgement B10 contains uncertainty indicator FU indicating the possible presence of an error and containing a contact address under which user 1 can complain about the error, step 614. Provisional load acknowledgement B10 is likewise signed with secret key GS of the clearing center and encrypted with session key SS.

Figure 7:
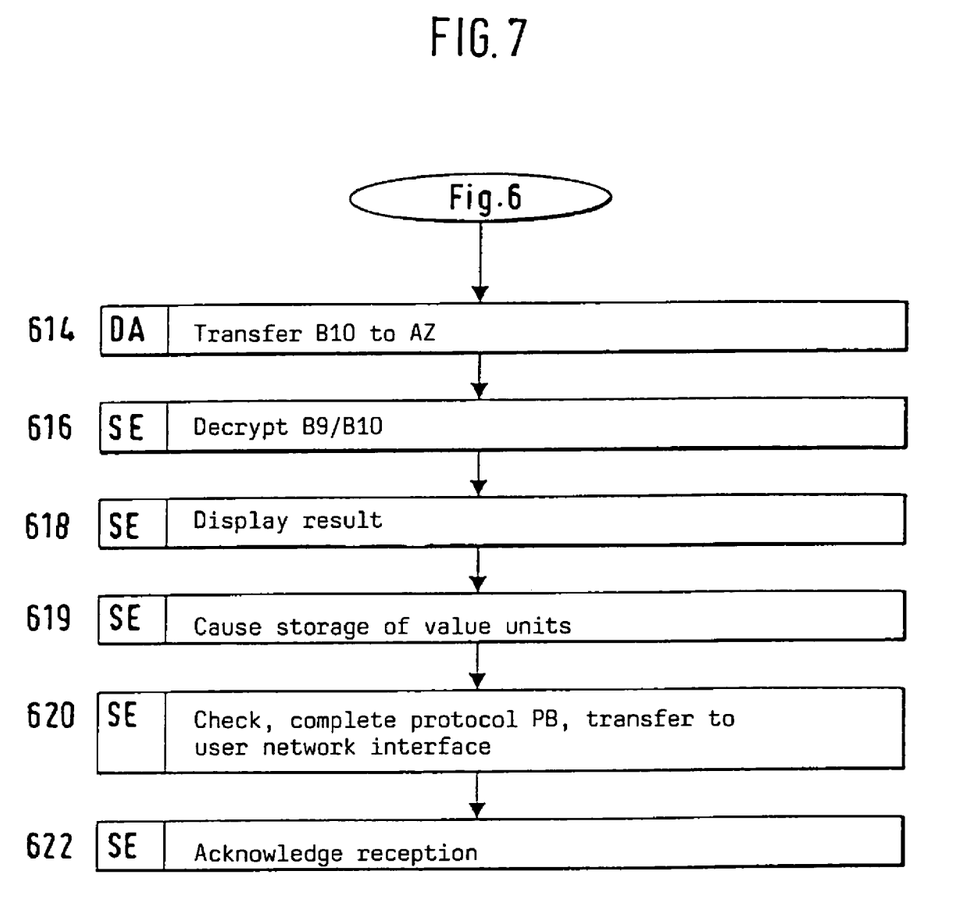

Load acknowledgement B9 or provisional load acknowledgement B10 is decrypted by security terminal 14 using session key SS, step 616. The result after decryption, i.e. acknowledgement of successful execution of the loading process upon reception of load acknowledgement B9 or the indication of a possible error upon reception of provisional load acknowledgement B10 together with the transferred contact address for complaint, is then displayed by security terminal 14 to user 1 via output means 17, step 616. In addition, the security terminal causes any transferred value units to be stored, step 619. This can be done in one of the components of user end system 10, with a network subscriber connected over data network 20 or else in an external device, e.g. a cell phone.

Going on from here, it can be provided that an acknowledgement of reception of value units is formed by security terminal 14 and they are returned to clearing center 30, step 620. This measure is expedient in particular when the value units are data whose importance consists in user 1 taking note thereof or that subsequently remain permanently on transaction medium 2 for repeated use, e.g. a PIN or cryptographic key.

Clearing center 30 forms protocol PB on the total data exchange effected, continuing protocol PA. It transfers total protocol PB or at least the parts newly added to protocol PA to security terminal 14, which checks it and adds the information present only in security terminal 14. Protocol PB subsequently contains all essential information exchanged by clearing center 30 and by service provider 40 with user end system 10 over data network 20. Complete protocol PB is transferred by security terminal 14 to the user network interface, where it is stored, step 622.

While maintaining the basic idea of securing a prenegotiation phase added in the course of a service acquisition for executing the order of the service by using identifier KM associated with a transaction medium used and linking it with the following compensation and delivery phases via identifier KM, the above-described method permits a number of embodiments. Thus, the above-described method is above all not limited to applications in which a service is delivered against transfer of an amount to be paid or an equivalent. The transfer of an amount to be paid can instead be replaced in the transaction phase by any other operation comprising access to sensitive data on transaction medium 2. For example, the method can be used for transferring a PIN or access code from clearing center 30 to user end system 10. In the payment process in the compensation phase, no amount to be paid is then transferred but a secret record exchanged or merely presented.

Further, the compensation phase need not necessarily involve a change of data on transaction medium 2. Rather, it can be provided that the certain data necessary for acquiring a service are only presented and checked.

In case only a low security level is required, the coupling between prenegotiation phase, compensation phase and delivery phase can be effected in an attenuated form. For example, identifier KM of transaction medium 2 can be converted in clearing center 30 into a simple standard value that merely acknowledges the presence of identifier KM.

The design of time monitoring routines is variable. Besides those described, further or different time periods can be monitored. Monitoring can also comprise correlations between different time periods. Network subscribers 10, 30 and 40 are in addition of variable design. In particular, components can be both combined or distributed over a plurality of further components.

The encryption techniques used can further be designed within broad limits. Both different principles and additional encryptions can be used.

The invention claimed is:

1. A method for acquiring a service offered by a service provider over a data network on presentation of a cash card having data stored thereon, said data corresponding to money in electronic form, by carrying out first a prenegotiation phase to order the service and subsequently a transaction phase including a compensation phase to make a contribution for delivery of the service, the service being ordered by means of a user end system that includes the cash card, from the service provider, the service provider thereupon calls a clearing center which subsequently enters into a data exchange with the user end system, to call for there from a necessary contribution in the form of certain data required for acquisition of the service, the method comprising steps in the prenegotiation phase of:

at the user end system, determining an individual identifier of the cash card, for use in the transaction phase that includes the data exchange that calls for the contribution in order to homogenously link the ordering process with the following compensation process;

at the user end system, sending a first prenegotiation message including the identifier to the clearing center; and at the user end system, receiving the identifier back there from the clearing center with a second prenegotiation message for acknowledgement;

wherein the compensation phase further comprises using the identifier to effect a data exchange in which the money in electronic form stored on the cash card is reduced by the amount to be paid and a corresponding amount is credited to the clearing center.

2. A method according to claim 1, characterized in that the identifier includes information that is applied in the data exchange that calls for the contribution.

3. A method according to claim 1, characterized in that the contribution called for includes a transfer of an amount to be paid.

4. A method according to claim 1, further comprising:

determining, at the clearing center after reception of the identifier, a preauthorization identifier; and sending the preauthorization identifier, to the user end system, together with the identifier.

5. A method according to claim 4, characterized in that the preauthorization identifier is formed individually upon each acquisition process.

6. A method according to claim 1, further comprising monitoring, at the clearing center, the time from reception of the identifier until reception of an enabling signal for the data exchange that calls for the contribution.

7. A method according to claim 1, further comprising monitoring, at the user end system, the time from sending the identifier until the onset of the data exchange that calls for the contribution.

8. A method according to claim 1, characterized in that the identifier is stored in the user end system.

9. A method according to claim 1, characterized in that the requested service is delivered by the service provider only when the clearing center has received the called-for service from the user end system.

10. A method according to claim 1, further comprising upon occurrence of an error after successful implementation of the data exchange that calls for the contribution, transferring, from the clearing center to the user system, a provisional load acknowledgement containing information allowing the user system to complain about the error.

11. A method according to claim 1, further comprising transferring reference information, from the user end system to the clearing center, to produce an association of a requested service with a user.

12. A method according to claim 11, further comprising sending the reference information, together with the identifier, back to the user end system for acknowledgement.

13. A method according to claim 1, further comprising:
  making a request for a particular kind of service from the service provider; and
  effecting an association of the service with a user only at the clearing center.

14. A method according to claim 1, further comprising:
  requesting a particular kind of service, scalable in terms of extent, from the service provider; and
  communicating the extent of the service only to the clearing center.

15. An assembly for executing a method for acquiring a service offered by a service provider over a data network on presentation of a cash card having data stored thereon, said data corresponding to money in electronic form, by carrying out a first prenegotiation phase to order the service and subsequently a transaction phase including a compensation phase to make a contribution for delivery of the service, the assembly comprising:
  a user end system, connected to the data network, to order the service in a prenegotiation phase using an individual identifier of the cash card; and
  a clearing center, connected to the data network, to request a contribution from the cash card in a transaction phase using the identifier associated with the cash card, the clearing center including a transaction module to communicate with the user end system, and a compensation module to request the contribution to be made by the cash card and to communicate with a background system in which a cash account associated with the cash card is stored;
  wherein the identifier is used to effect a data exchange in which the money in electronic form stored on the cash card is reduced by the amount to be paid and a corresponding amount is credited to the clearing center.

16. An assembly according to claim 15, characterized in that the user end system comprises a security terminal allowing the determination of the identifier located on the transaction medium.

17. An assembly according to claim 15, characterized in that the security terminal has storage means for storing the identifier read from the transaction medium.

18. An assembly according to claim 15, characterized in that the clearing center performs the ordering process and the data exchange for requesting the contribution using separate modules.

19. The method of claim 1, wherein the transaction phase further comprises using the identifier to effect a data exchange in which electronic money located in the transaction medium is reduced by the amount to be paid and a corresponding amount is credited to the clearing center.

* * * * *